United States Patent [19]

Miles et al.

[11] Patent Number: 4,630,486
[45] Date of Patent: Dec. 23, 1986

[54] MEASURING INSTRUMENTS

[75] Inventors: James J. Miles, Birch Vale; John M. Smith, Keighley, both of England

[73] Assignee: The BOC Group, Inc., Montvale, N.J.

[21] Appl. No.: 735,906

[22] Filed: May 20, 1985

[30] Foreign Application Priority Data

May 22, 1984 [GB] United Kingdom ............... 8413048

[51] Int. Cl.⁴ .................................................. G01F 1/24
[52] U.S. Cl. ............................ 73/861.56; 250/231 R
[58] Field of Search ..................... 73/861.55, 861.56; 250/231 R, 577

[56] References Cited

U.S. PATENT DOCUMENTS 2,808,580 10/1957 Fuller ..................... 73/861.55 X
2,912,858 11/1959 Fuller ........................ 73/861.56
3,623,365 11/1975 Lowell ....................... 73/861.56
4,200,806 4/1980 Walker et al. ............ 73/861.56 X

FOREIGN PATENT DOCUMENTS 604113 10/1934 Fed. Rep. of Germany ... 73/861.56

Primary Examiner—Herbert Goldstein
Attorney, Agent, or Firm—Roger M. Rathbun; Larry R. Cassett

[57] ABSTRACT

A flowmeter of the type having a float 3 freely movable along the bore of a tapered tube 2 includes a source 8 of electromagnetic energy and a sensor 28 for detecting said energy when emitted by the source 8 axially along the tube 2. The arrangement is such that, for a given flowrate of fluid through tube 2, the float 3 will take up a corresponding position in the bore of the tube 2 thereby determining the amount of energy reaching the sensor 28 from the source 8.

7 Claims, 2 Drawing Figures

MEASURING INSTRUMENTS

BACKGROUND OF THE INVENTION

The present invention relates to devices for measuring the flowrate of fluids and in particular to such devices which incorporate a tapered flow tube within which is arranged a float.

It is known from published UK Patent Application No. 2111 196 A, for a flowmeter to include a glass tube with a tapered bore through which fluid, whose flowrate is to be measured, can flow. Arranged within the tube is a float which is so shaped that its position within the bore is dependent upon the flowrate of the fluid through the tube.

Radiation energy is directed across the path of movement of the float within the tube onto a tapered strip of photoconductive film on the glass tube surface behind the float. The electrical resistance of the film varies as a function of the position of the energy shadow incident on it due to the position of the float in the bore of the glass tube.

UK Pat. No. 807494 describes a device for sensing when the flowrate of a fluid within a pipe has dropped below a predetermined value. The device includes a vertical tapered tube for the passage therethrough of the fluid. A float is freely movable along the length of the tube. A photo-electric cell is arranged at or adjacent the bottom end of the tube so that ambient or other light entering the tube from the sides thereof will reflect from the lower half of the float towards the photo-electric cell.

When fluid flow through the tube lessens the float drops and at a predetermined cut-off point light is no longer reflected from the float in sufficient amount to operate the photo-electric cell and an alarm is actuated.

Medical equipment, for example, anaesthesia machines frequently require that the flowrate of two or more fluids be measured simultaneously and usually this is achieved by banks of flowmeters arranged side-by-side Flowmeters and sensing devices of the type described in UK Patent Application No. 2111 196 A and UK Pat. No. 807494 in which energy is radiated across the path of the movement of the float will either increase the overall width of the bank of flowmeters or obstruct vision of the float and tube.

SUMMARY OF THE INVENTION

It is an aim of the present invention to provide a device for measuring the flowrate of a fluid which detects energy emitted axially along the tube to thereby overcome the disadvantages of the known flowmeter referred to above.

According to the present invention, a device for measuring the flowrate of a fluid comprises a tube having a tapered bore for the passage therethrough of the fluid, a float freely movable along the length of the tube, a source of electromagnetic radiation and a sensor for detecting electromagnetic radiation emitted by the source axially along the tube, the arrangement being such that, for a given flowrate of fluid through the tube, the float will take up a corresponding position in the bore of the tube thereby determining the amount of electromagnetic energy reaching the sensor from the source.

Preferably, the source is positioned at one end of the tube whilst the sensor is positioned at the opposite end of the tube, the annular gap between the float and the inner surface of the tube determining the amount of electromagnetic energy reaching the sensor from the source.

Alternatively, the source and the sensor are positioned at the same end of the tube and at least a portion of the outer surface of the float is reflective to the electromagnetic radiation emitted by the source to reflect the radiation towards the sensor.

BRIEF DESCRIPTION OF DRAWINGS

Embodiments of the invention will be described by way of example, reference being made to the Figures of the accompanying diagrammatic drawings in which.

DESCRIPTION OF PREFERRED EMBODIMENT

Figure 1:
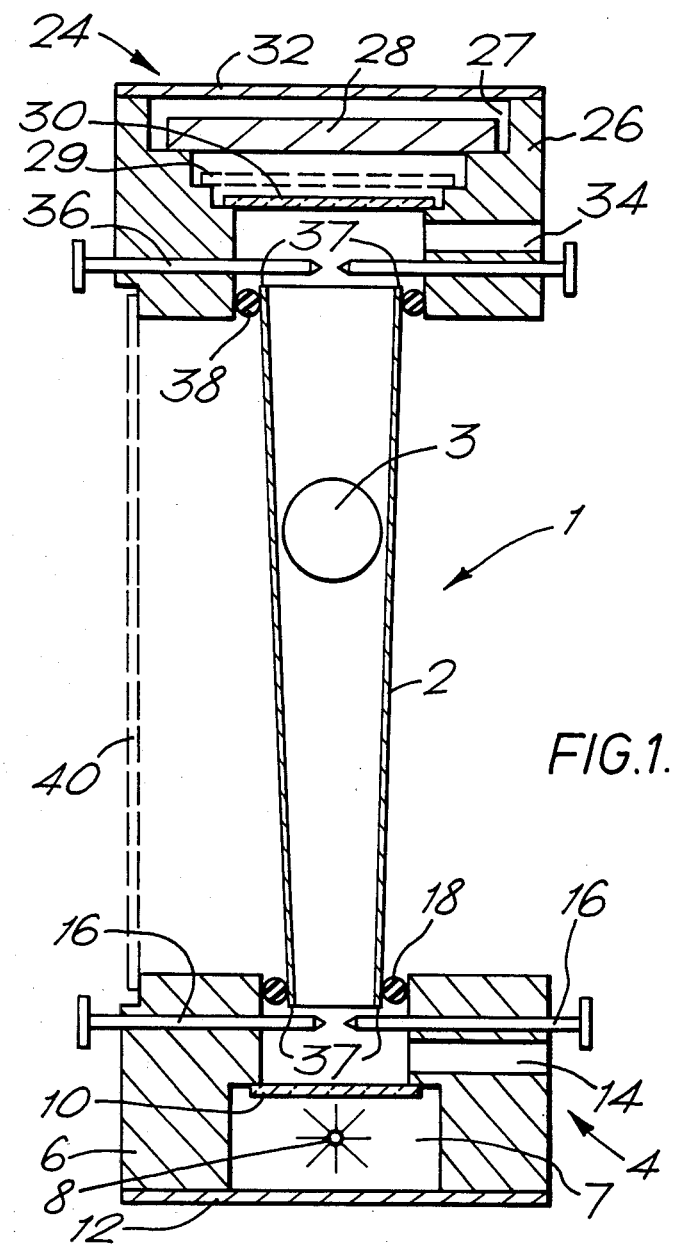
FIG. 1 is a diagrammatic sketch of the device for measuring the flowrate of a fluid.

As shown in FIG. 1, a device 1 for measuring the flowrate of a fluid comprises an elongate flow tube 2 having a tapered bore open at each end for the passage therethrough of a fluid whose velocity is to be measured. A spherical float 3 is arranged within the tube 2 and is freely movable along the length of the tube.

At one (lower as shown) end of the tube 2 there is provided an emitter assembly 4 which includes a housing 6 containing, in a compartment 7 a source 8 of electromagnetic radiation. The compartment 7 has a window 10 which permits electromagnetic energy emanating from the source 8 to pass axially along the interior of the tube 2. The housing 6 is closed by a cover 12 and includes an inlet 14 for the passage thereinto of the fluid. Float stops 16 are mounted in the housing 6 and extend as shown over the lower end of the tube 2. A seal 18 is provided to permit the emitter assembly 4 to be mounted around the lower end of the tube 2 in a gas tight manner.

At the opposite (upper as shown) end of the tube 2 there is provided a detector assembly 24 which includes a housing 26 containing, in a compartment 27, a sensor 28 for detecting electromagnetic radiation emitted by the source 8 axially along the tube 2.

In the present embodiment, the source 8 is an infrared LED source and the sensor 28 is a large area photodiode.

The compartment 27 also contains an infra-red filter 29 and a window 30. The housing 26 is closed by a cover 32 and includes an outlet 34 for the exit thereof from the housing of fluid. Float stops 36 are mounted in the housing 26 and extend as shown over the upper end of tube 2. A seal 38 is provided to permit the detector assembly 24 to be mounted around the upper end of the tube 2 in a gas tight manner.

Preferably, the end faces 37 of the flow tube 2 are blackened to prevent or inhibit the passage through the wall of the flow tube of electromagnetic radiation emitted by source 8.

A filter 40, partially shown in dotted lines surrounds the tube to screen the tube 2 from ambient radiation.

It will be appreciated, that should a sensor be used which is insensitive to ambient light at is operating frequency then filters 29, 40 can be dispensed with.

An electronics processing package which may include amplifiers, linearizers analogue to digital converters and the like is provided and can be located adjacent to the tube 2 and is connected electrically to the source 8 and to the sensor 28. This package may include electronic elements for providing a pulse or chopped emitter/detector technique.

In operation, the fluid whose flowrate is to be measured passes into the housing 6 via inlet 14 and up through tube 2 into housing 26 and exits from the device 1 via outlet 34. As the flow through the tube 2 is varied then the float 3 will rise or fall in the tube 2. If the float 3 rises to accommodate an increase in flowrate then the annular gap between the outer surface of the float 3 and the inner surface of the tube 2 will enlarge thereby allowing more of the electromagnetic energy emanating from the source 8 to reach the sensor 28. The sensor 28 will generate a signal corresponding to the amount of energy it detects coming from the source 8 which signal will be communicated to the electronics package which will provide a readout indicating the fluid flowrate through the tube 2.

It follows that since the tube 2 is tapered, as the float moves along the tube in response to changes in fluid flowrate so will the area of the annulus between the float 3 and the tube 2 vary, thereby varying the signal that is generated by the sensor 28.

Figure 2:
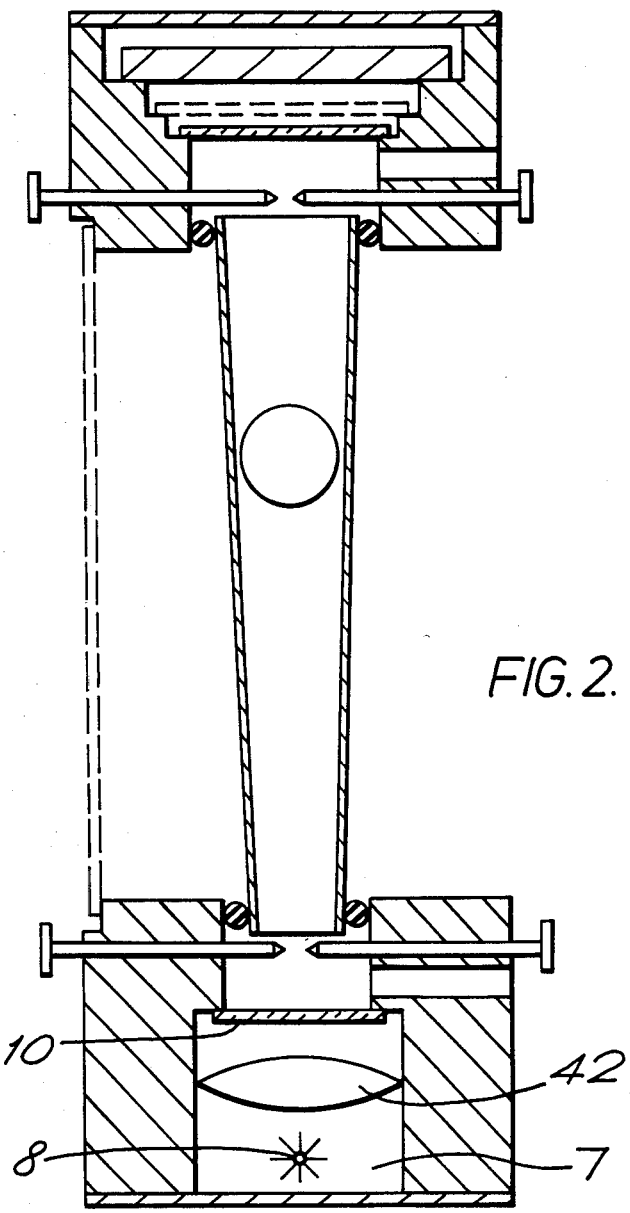
FIG. 2 is a diagrammatic sketch incorporating a modification of the device as shown in FIG. 1.

Referring now to FIG. 2, in a modification a lens system 42 may be positioned in the compartment 7 between the source 8 and the window 10 to direct the electromagnetic radiation emitted from the source 8 as a beam within and along the tube 2 said beam diverging substantially the same as the divergence of the tapered tube 2.

A particular advantage of the embodiments described above is that the energy level detected by the sensor 28 is determined by the annular gap between the float 3 and the inner surface of the tube 2 and so provides a direct measure of fluid flowrate. Should the inside of the tube 2 become dirty or partially occluded it is clear that the devices described in the above embodiments provide a better signal than any which rely solely on the relationship between the height of the float 3 in the tube 2 and fluid flowrate.

Although in the above described embodiments the emitter assembly 4 and the detector assembly 24 are arranged at opposite ends of the tube 2, in a further embodiment the emitter assembly and detector assembly could be arranged at the same end of the tube 2 so that the detector assembly senses the light reflected from a reflective surface on the float 3. If the float 3 rises due to an increase in the flowrate of the fluid passing through the tube 2 then the energy reflected back will fall in inverse square ratio to the distance travelled and this will be seen as a change in output of the sensor adjacent to the source. Alternatively, the sensor could detect reflection from a reflective plate arranged at the opposite end of the tube.

It is also possible that the emitter and detector assemblies be arranged at both ends of the tube measuring any combination of transmission or reflection.

The particular shape of the float stops 16, 36 illustrated in FIGS. 1 and 2 does tend to block some of the electromagnetic radiation from the source 8 from passing axially along flow tube 2 and through the annular gap between the inside surface of the flow tube and the float 3. In order to minimise this tendency float stops, known in the art, can be used which have a central stop part co-axial with the flow tube 2 and thin radially extending anchoring flanges which are a tight fit in the ends of the flow tube. The thin flanges offer very little resistance to he flow of electromagnetic radiation from the source 8 along the flow tube 2.

Although reference has been made to the source emitting infra-red radiation, a source could equally emit white, monochromatic, or ultra-violet radiation. In any event the sensors would be chosen so as to provide either actively a direct EMF in proportion to the amount of energy which falls on them or passively in the sense that some property such as resistance or capacitance changes in response to the light which change is measured by suitable electronic means.

We claim:

1. A device for measuring the flowrate of a fluid comprising a tube having a tapered bore for the passage therethrough of the fluid, a float freely movable along the length of the tube, means for producing a beam of electromagnetic radiation within and along the tube diverging at an angle substantially the same as the tapered divergence of said bore and a sensor for detecting electromagnetic radiation emitted by said means axially along the tube, the arrangement being such that, for a given flowrate of fluid through the tube, the float will take up a corresponding position in the bore of the tube thereby determining the amount of electromagnetic energy reaching the sensor from the source.

2. A device as claimed in claim 1, in which said means for producing a beam of electromagnetic radiation is positioned at one end of the tube whilst the sensor is positioned at the opposite end of the tube, the annular gap between the float and the inner surface of the tube determining the amount of electromagnetic energy reaching the sensor from the source.

3. A device as claimed in claim 1, in which said means for producing a beam of electromagnetic radiation and the sensor are positioned at the same end of the tube and at least a portion of the outer surface of the float is reflective to the electromagnetic radiation emitted to reflect the radiation towards the sensor.

4. A device as claimed in claim 1, in which the sensor generates an electrical signal corresponding to the amount of radiation it detects, which signal is electronically processed to provide a read-out indicating the fluid flowrate through the tube.

5. A device as claimed in claim 1, in which said means for producing a beam of electromagnetic radiation comprises an infrared emitting diode and alens and the sensor is a photodiode.

6. A device as claimed in claim 1, in which an electromagnetic radiation filter surrounds the tube.

7. A device as claimed in claim 1, in which float stops are arranged at each end of the tapered tube.

* * * * *